(12) United States Patent
Peng et al.

(10) Patent No.: US 7,783,723 B2
(45) Date of Patent: Aug. 24, 2010

(54) SYSTEMS AND METHODS FOR SUBMITTING DATA FROM A WML-BASED BROWSER

(75) Inventors: Wei-Guo Peng, Elztail-Dallau (DE); Fridtjof Graef, Heidelberg (DE)

(73) Assignee: SAP AG, Walldorf (DE)

( * ) Notice: Subject to any disclaimer, the term of this patent is extended or adjusted under 35 U.S.C. 154(b) by 635 days.

(21) Appl. No.: 11/393,702

(22) Filed: Mar. 31, 2006

(65) Prior Publication Data

US 2007/0233813 A1    Oct. 4, 2007

(51) Int. Cl.
G06F 15/16    (2006.01)

(52) U.S. Cl. ................ 709/219; 709/217; 709/218; 709/220; 709/221; 455/414.1; 455/550.1; 455/411

(58) Field of Classification Search ............. 709/217, 709/218, 219, 220, 221, 222, 223, 224, 225; 455/414.1, 558, 566
See application file for complete search history.

(56) References Cited

U.S. PATENT DOCUMENTS

| | | | | |
|---|---|---|---|---|
| 6,727,916 | B1* | 4/2004 | Ballard | 715/758 |
| 2002/0035579 | A1* | 3/2002 | Wang et al. | 707/513 |
| 2002/0091797 | A1* | 7/2002 | Wallenius et al. | 709/218 |
| 2003/0018714 | A1* | 1/2003 | Mikhailov et al. | 709/203 |
| 2003/0078842 | A1* | 4/2003 | Scholten et al. | 705/14 |
| 2003/0109247 | A1* | 6/2003 | Lindgren et al. | 455/412 |
| 2003/0110277 | A1* | 6/2003 | Cheng et al. | 709/231 |
| 2003/0115301 | A1* | 6/2003 | Koskimies | 709/221 |
| 2003/0162540 | A1* | 8/2003 | Nielsen | 455/425 |
| 2004/0104938 | A1* | 6/2004 | Saraswat et al. | 345/764 |
| 2004/0225749 | A1* | 11/2004 | Pavlik et al. | 709/245 |

OTHER PUBLICATIONS http://www.wapforum.org/what/WAP_white_pages.pdf "Wireless Application Protocol" Wireless Internet Today Jun. 2000.*
http://www.teco.edu/~albrecht/publication/draft_docs/wap-design-paper.pdf "WAP—Designing for Small User Interfaces"-Oliver Frick.*
"WML Script and Server Configuration" http://www2.hawaii.edu/~binsted/ics466/DFM9.pdf Hawaii.edu Nov. 4, 1999.*
"Potential Threats to WAP Enabled Devices" http://www.symantec.com/avcenter/reference/threats.to.wap.devices.pdf-Eric Chien.*
"WML Scripts Standard Libraries Specification" http://www.wapforum.org/what/technical/wmlssl-30-apr-98.pdf Version Apr. 30, 1998.*

* cited by examiner

*Primary Examiner*—Joseph Thomas
*Assistant Examiner*—Randy Scott
(74) *Attorney, Agent, or Firm*—Mintz, Levin, Cohn, Ferris, Glovsky and Popeo, P.C.

(57) ABSTRACT

Systems, methods, and apparatus, including computer program products, are provided for communications between a client and server, both of which support a markup language, such as the Wireless Markup Language (WML). In one exemplary embodiment, the system, method, and apparatus may include generating, at a server, a WML deck, the WML deck including one or more first cards, the first cards having one or more first parameters; and generating, at a server, one or more second cards, the second cards having one or more second parameters, the second parameters determined to include a single instance of the first parameters to limit any duplicate first parameters.

20 Claims, 5 Drawing Sheets

SYSTEMS AND METHODS FOR SUBMITTING DATA FROM A WML-BASED BROWSER

FIELD

The present invention generally relates to data processing. More particularly, the present invention relates to data exchanges between a client and server, both of which support a markup language, such as the Wireless Markup Language (WML).

BACKGROUND

The Wireless Application Protocol (WAP) is an application communication protocol used to access services and information for handheld, wireless devices such as mobile phones, personal digital assistants (PDAs), Blackberries, and the like. The WAP standard is based on Internet standards, such as HyperText Markup Language (HTML), Extensible Markup Language (XML), and Transmission Control Protocol/Internet Protocol (TCP/IP), and shares some common features. The WAP standard consists of a Wireless Markup Language (WML) specification, a WMLScript specification, and a Wireless Telephony Application Interface (WTAI) specification.

To fit into a small wireless terminal, WAP uses a micro-browser to display information written in WML. A micro-browser is like a web browser, which is a software application used to locate and display web pages. Unlike a web browser, a micro-browser is optimized for the small screens of handheld, wireless devices. For example, a micro-browser is optimized to make minimal demands on hardware, memory, and central processing unit (CPU) usage of the wireless device. The micro-browser can also interpret a reduced version of JavaScript called WMLScript.

WML is a mark-up language derived from HTML; however, it is based on XML, a much stricter standard. A major difference between HTML and WML is that the basic unit of navigation in HTML is a page, while in WML the basic unit of navigation is a card. In both HTML and WML, navigation may be achieved through the use of Uniform Resource Locators (URLs) contained within the card data or the like. A WML file can contain multiple cards and, together, these cards form a WML deck. As a whole, the WML deck forms a cohesive and logically connected group of WML cards where each WML card is associated with a single display screen on a WAP-enabled device, such as a mobile phone, PDA, or Blackberry. When a user goes to a WAP site, the micro-browser (also referred to as "browser") downloads a WML file that contains a deck of cards from the server. Only the display screen associated with one card of the deck will be shown on the screen of the client device at a time. These cards can link to other cards in the deck, and navigating between cards can be achieved either programmatically or in response to user input by means of Uniform Resource Locators (URLs) contained within the cards. If the user goes to another card of the same deck, the micro-browser does not have to send a request to the server since the deck and all of its cards are already stored on the WAP-enabled device. WML is designed in this way because wireless devices have a high latency for connecting to the server. Downloading an entire WML deck with a single access to the server can lower the number of round trips to the server.

Cards can contain links, text, images, input fields, option boxes, and many other elements. When a user enters data or moves from card to card within the deck, parameter values may be updated, changed or otherwise modified. Once a user has finished navigating through the deck or entered the appropriate command, the deck is submitted to the server. Since variables are valid across cards and every card may send parameters and their values to the server, one or more copies of the same parameter may be submitted to the server. This results in an inefficient use of the small wireless bandwidth and causes poor system performance.

SUMMARY

The present invention provides systems, methods, and apparatus, including computer program products, for data exchanges between a browser and server, both of which support a markup language, such as the Wireless Markup Language (WML).

In one exemplary embodiment, there is provided a computer program product tangibly embodied on a computer-readable medium containing instructions for exchanging data in a networked environment. The instructions may include: generating, at a server, one or more first cards, the first cards having one or more first parameters; and generating, at a server, one or more second cards, the second cards having one or more second parameters, the second parameters determined to include a single instance of the first parameters to limit any duplicate first parameters.

In another exemplary embodiment, there is provided a computer program product tangibly embodied on a computer-readable medium containing instructions for exchanging data in a networked environment. The instructions may include: receiving, at a client, one or more first cards, the first cards having one or more first parameters; and receiving, at a client, one or more second cards, the second cards having one or more second parameters, the second parameters determined to include a single instance of the first parameters to limit any duplicate first parameters.

In another exemplary embodiment, there is provided a method for exchanging data in a networked environment. The method may include: generating, at a server, one or more first cards, the first cards having one or more first parameters; and generating, at a server, one or more second cards, the second cards having one or more second parameters, the second parameters determined to include a single instance of the first parameters to limit any duplicate first parameters.

In another exemplary embodiment, there is provided a system for exchanging data in a networked environment. The system may include: a processor; and a memory, wherein the processor and the memory are configured to perform a method including: generating, at a server, one or more first cards, the first cards having one or more first parameters; and generating, at a server, one or more second cards, the second cards having one or more second parameters, the second parameters determined to include a single instance of the first parameters to limit any duplicate first parameters.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and sub-combinations of the disclosed features and/or combinations and sub-combinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely examples consistent with certain aspects related to the invention. Wherever possible, the same reference numbers will be used throughout the drawings to refer to the same or like parts.

Figure 1:
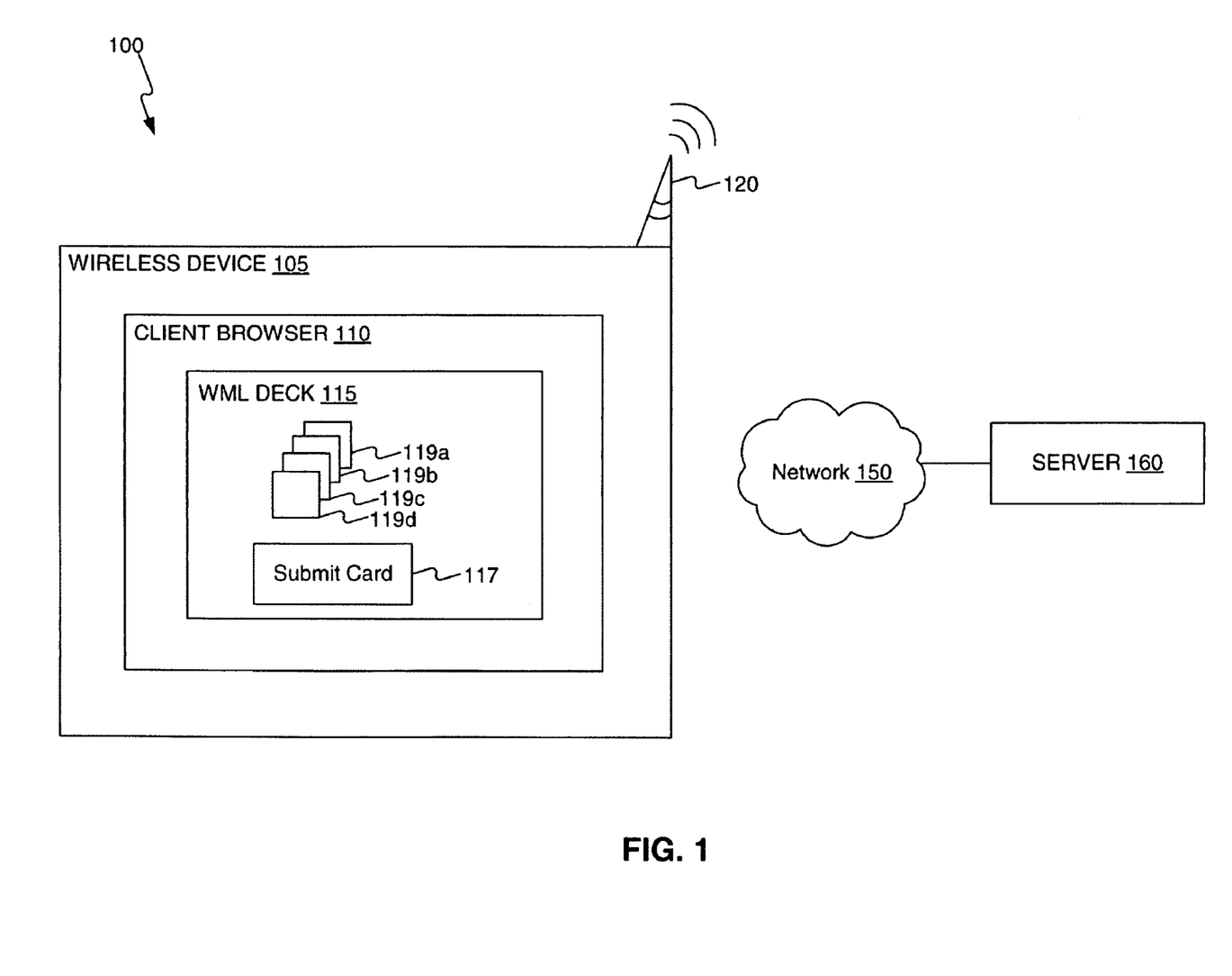
FIG. 1 illustrates a block diagram of an exemplary system environment consistent with certain aspects related to the present invention.

FIG. 1 depicts a system 100. System 100 includes a client (e.g., a wireless device) 105, a network 150, and a server 160. Wireless device 105 communicates wirelessly to network 150. For example, wireless device 105 may send packets to, and receive packets from, server 160 through network 150. Although communications between wireless device 105 and network 150 is wireless, communication between network 150 and server 160 may be in any form (i.e., wired or wireless). Server 160 may also include a WAP server interface (e.g., a gateway), which allows server 160 to interact with wireless device 105 and browser 110 using WAP and WML. Server 160 may also function as a WAP server interface (e.g., a gateway), serving as an intermediary between wireless device 105 and another server 160, if server 160 is not capable of supporting the WAP protocol. A WAP server interface (e.g., a gateway) may be implemented using software that performs several functions between the WAP device and the server 160. These functions include, for example: converting the markup language (WML) from text format to tokenized (binary/compressed) format, translating requests from the WAP device to HyperText Transfer Protocol (HTTP) requests, converting between Secure Sockets Layer (SSL) encryption and Wireless Transport Layer Security (WTLS) encryption, and converting between Transmission Control Protocol (TCP) and Wireless Datagram Protocol (WDP). If a WAP gateway is hosted by a mobile operator, the mobile operator may use the gateway to add mobile specific information into the HTTP stream such as the subscriber number, location details, etc.

Figure 3:
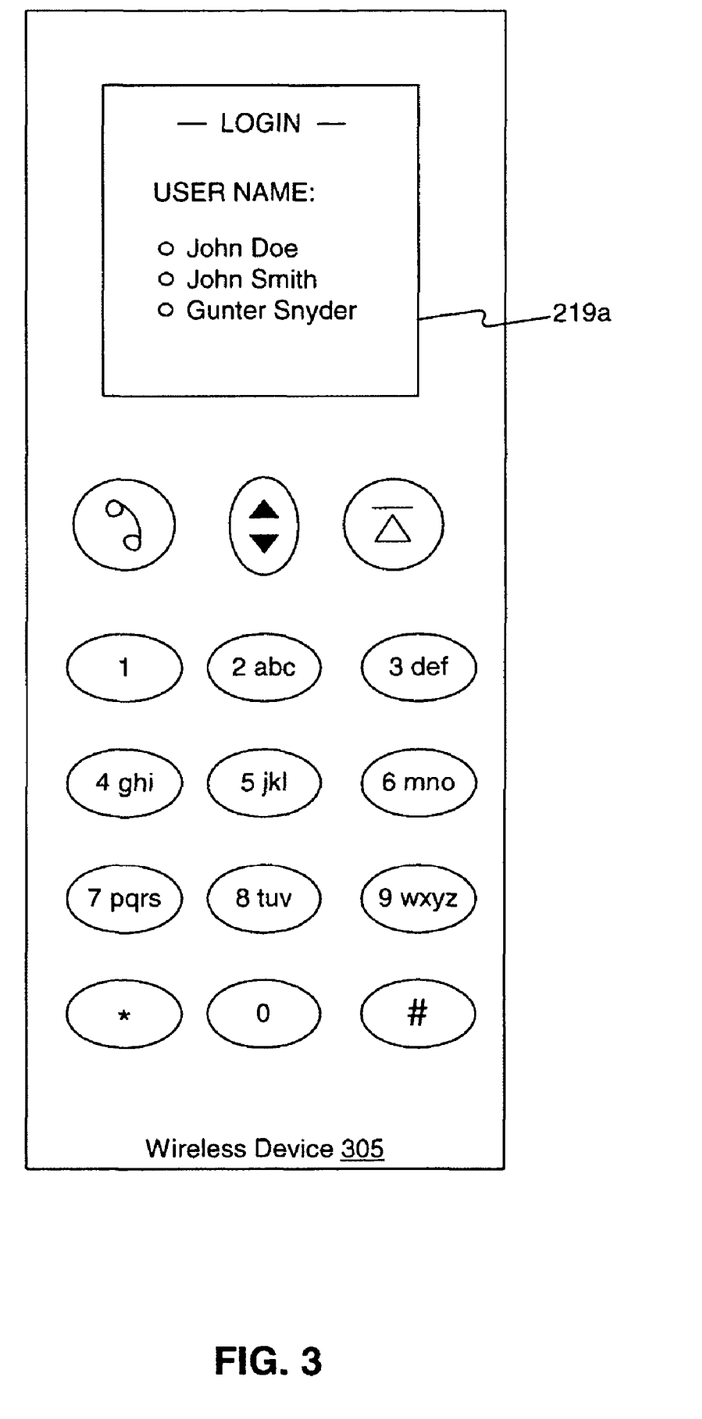
FIG. 3 depicts a block diagram of an exemplary wireless device displaying a card from FIG. 2 consistent with certain aspects related to the present invention.

Wireless device 105 may be implemented as any device capable of communicating wirelessly with other devices. Examples of wireless devices include a mobile phone, a Blackberry, a personal digital assistant, a portable computer, and the like. In addition, wireless device 105 may also be referred to as client device in a networked environment. Wireless device 105 may further include a display (as shown in FIG. 3), for example, for allowing an interaction with applications at server 160. Wireless device 105 may also include a browser 110, such as a web browser or micro-browser, for interacting with (e.g., running) an application at server 160. Further, wireless device 105 contains a processor (not shown) and a memory (not shown) for the processing and storage of the WML deck, cards, parameters, parameter values, and instructions for the methods described herein.

Browser 110 may include a WML deck 115 including WML cards 119a-d and a submit card 117. A WML card (also referred to as "card") contains the data and parameters required to display a single screen display at the wireless device 105. Each WML card may be associated with other WML cards to form a WML deck 115. The WML card may include navigation information, such as a Uniform Resource Locator (URL), to navigate from one card to other cards. Often, an entire WML deck 115 is loaded by the wireless device 105 when browser 110 makes a request to server 160. While the example illustrates a deck composed of five cards, cards 119a-d and submit card 117, the deck may include any number of cards from as few as one card to as many as may be required.

Submit card 117 may be a card that consolidates parameters from cards 119a-d and then submits the parameters to server 160. Submit card 117 may also be a hidden card, which is not displayed. In one embodiment, consistent with aspects of the present invention, submit card 117 contains a single instance of each parameter and does not send duplicate (i.e., redundant) parameters to server 160. Server 160 provides submit card 117 to wireless device 105 as a template. For example, submit card 117 may include WML tags and one or more blank data (or parameter) fields corresponding to the data fields found in the cards. Tags are textual commands contained between a less-than sign, "<", and a greater-than sign, ">", which direct the browser 110 on format, presentation, or display of data.

Network 150 may provide wireless communication to wireless device 105 through antenna 120. Wireless device 105 may communicate with network 150 and server 160 using Bluetooth, CDMA2000, WiFi, or any other wireless communication mechanism. Although network 150 supports wireless communications to wireless device 105, communications to server 160 may be over a wireless and/or wired network. As such, network 150 may include, alone or in any suitable combination, the following: a telephony-based network, a local area network (LAN), a wide area network (WAN), a dedicated intranet, wireless LAN, the Internet, Bluetooth, an intranet, a wireless network, a bus, or any other communication mechanisms. Moreover, network 150 may be embodied using bi-directional, unidirectional, or dedicated communication links. Network connections (not shown) may also implement standard transmission protocols, such as Transmission Control Protocol/Internet Protocol (TCP/IP), Hyper Text Transfer Protocol (HTTP), Simple Object Access Protocol (SOAP), Router Discovery Protocol (RPC), or other protocols.

Server 160 may include one or more processors (not shown), such as computers or other computing devices, to interface with other computers or computing devices, such as browser 110 or wireless device 105. Further, server 160 contains a memory (not shown) for the processing and storage of the WML deck, cards, parameters, parameter values, and instructions for the methods described herein. Moreover, server 160 may include one or more applications, such as telephony services or web services. For example, a service at server 160 may serve as an endpoint which may be called with a request generated by browser 110. In some implementations of the service at server 160, the service, when called, may instantiate one or more business objects. An "object" means a bundle of variables (e.g., data) and related methods accessed by software. In object-oriented programming, an object is a concrete realization (instance) of a class that consists of data and the operations associated with that data. The phrase "business object" refers to a bundle of variables and related methods that can be used for describing a business process or task. For example, when a database application at server 160 is called by browser 110, the database application may instantiate a business object for providing a sales order form, which allows browser 110 to interact with (e.g., login, run, fill-out, and the like) the form. In other implementations, server 160 may generate a WML deck 115 in response to wireless device 105 action, request, or state change.

Server 160 may include deck generators and card generators to responsively generate WML decks 115. Deck generators and card generators are commercially available, such as Websydian 5.6™ (Websydian, Soeberg, Denmark). Moreover, deck generators and cards generators may be located at server 160 or any other server accessible by server 160 through a network 150, such as the internet.

Figure 2:
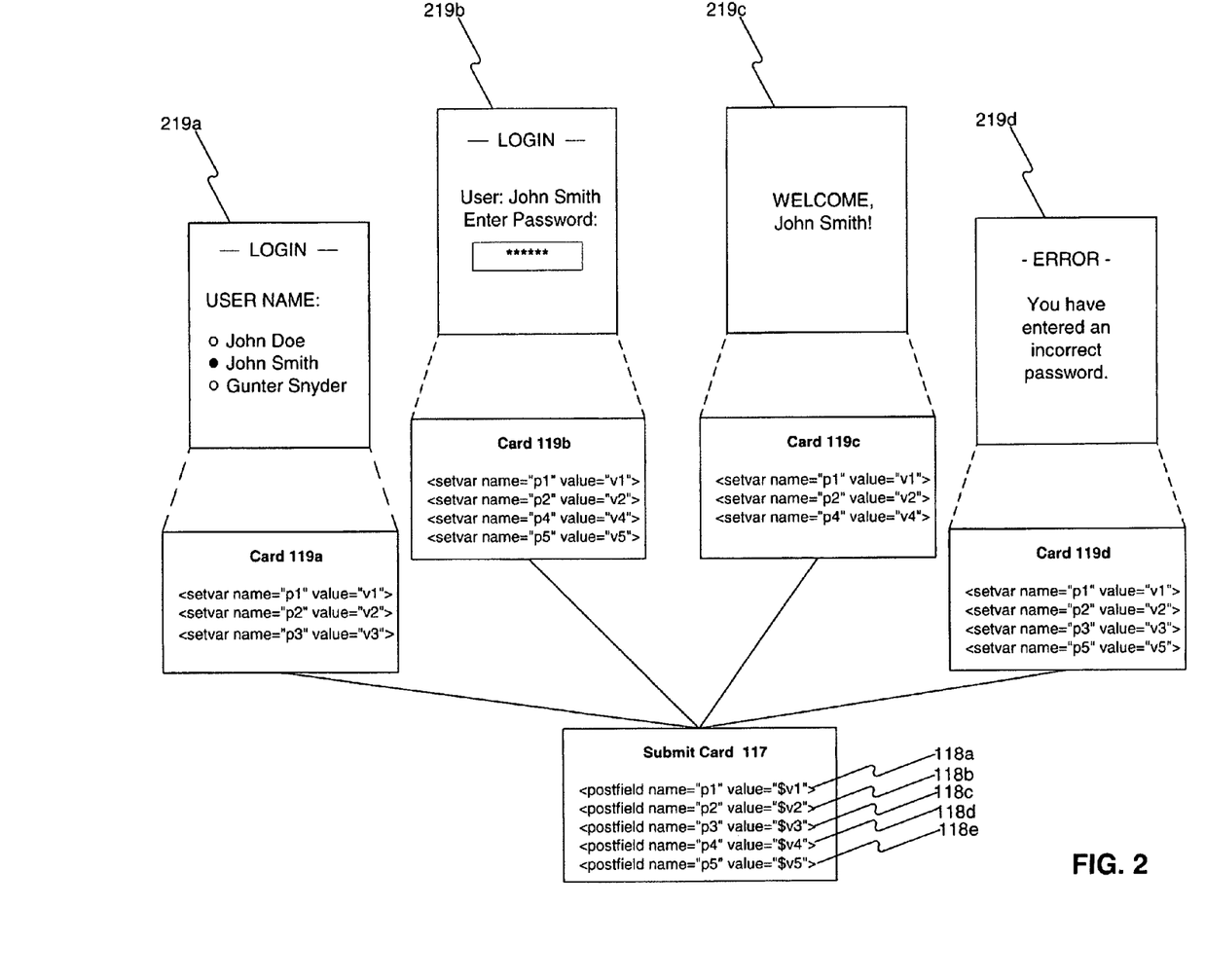
FIG. 2 depicts a WML deck having four cards and a submit card, which is used to submit parameters to a server consistent with certain aspects related to the present invention.

FIG. 2 depicts cards 119*a-d* and submit card 117. Cards 119*a-d* may represent a group of related displays 219*a-d* for wireless device 105 where each card 119*a-d* contains the parameters, instructions, and other data necessary to display a single display 219*a-d* on a wireless device 105. For example, card 119*a* may provide the parameters, instructions, and other data necessary to display a login screen 219*a* with the names of three people available for selection (represented on card 119*a* by parameters p1-p3). When a user selects a name, e.g., John Smith (represented on card 119*a* by parameter p2) from login screen 219*a*, card 119*a* may navigate, by means of a URL or the like, to card 119*b* causing screen 219*b* to be displayed. For example, screen 219*b* may display the login name, John Smith (represented on card 119*b* by p2) selected by the user, and a request for a password (represented on card 119*b* by p4) from the user. Upon successful entry of a password through user interaction with screen 219*b*, card 119*b* processes the data. If the entered password is correct, card 119*b* may navigate to card 119*c* and screen 219*c* will be displayed providing a personalized welcome screen. Alternatively, if the user has entered an incorrect password, card 119*b* may navigate to card 119*d* and screen 219*d* may be displayed with an error message.

When a user completes navigation of the deck, either through card 119*c* or card 119*d*, as in this example, submit card 117 provides the parameters to server 160. Instead of providing multiple copies of the parameters, submit card 117 submits only a single copy of each parameter, p1-p5. In this example, card 119*a* contains parameters p1-p3, card 119*b* contains parameters p1, p2, p4, and p5, card 119*c* contains parameters p1, p2, and p4, and card 119*d* contains parameters p1, p2, p3, and p5. Instead of sending the parameter data contained on card 119*a* (p1, p2, p3, p4), followed by the data on each of cards 119*b*-119*d*, only the data contained on the submit card 117, parameters 118*a-e* (p1, p2, p3, p4, p5), are sent to server 160. Submit card 117 thus includes all the parameters associated with cards 119*a-d* with none of the parameters duplicated or repeated. The result is that only a single copy of each parameter from wireless device 105 is sent to server 160. As such, the use of a submit card 117 may reduce the transmission of duplicate data. In the wireless environment, reducing the amount of data transmitted between wireless device 105 and server 160 may save communication resources as well as save costs associated with the use of those resources.

FIG. 3 depicts an exemplary wireless WAP-enabled device 305 for use with the present disclosure. Wireless device 305 discloses an exemplary display screen 219*a* containing the data of card 119*a*. In this example, display screen 219*a* lists three names available for login to server 160. A user would scroll down using a WAP-enabled softkey 310 on the wireless device to select one of the names, e.g., "John Smith." The parameter associated with the selection of "John Smith" would be saved by card 119*a* and later sent to server 160 by submit card 117, as disclosed with respect to FIG. 2.

Figure 4:
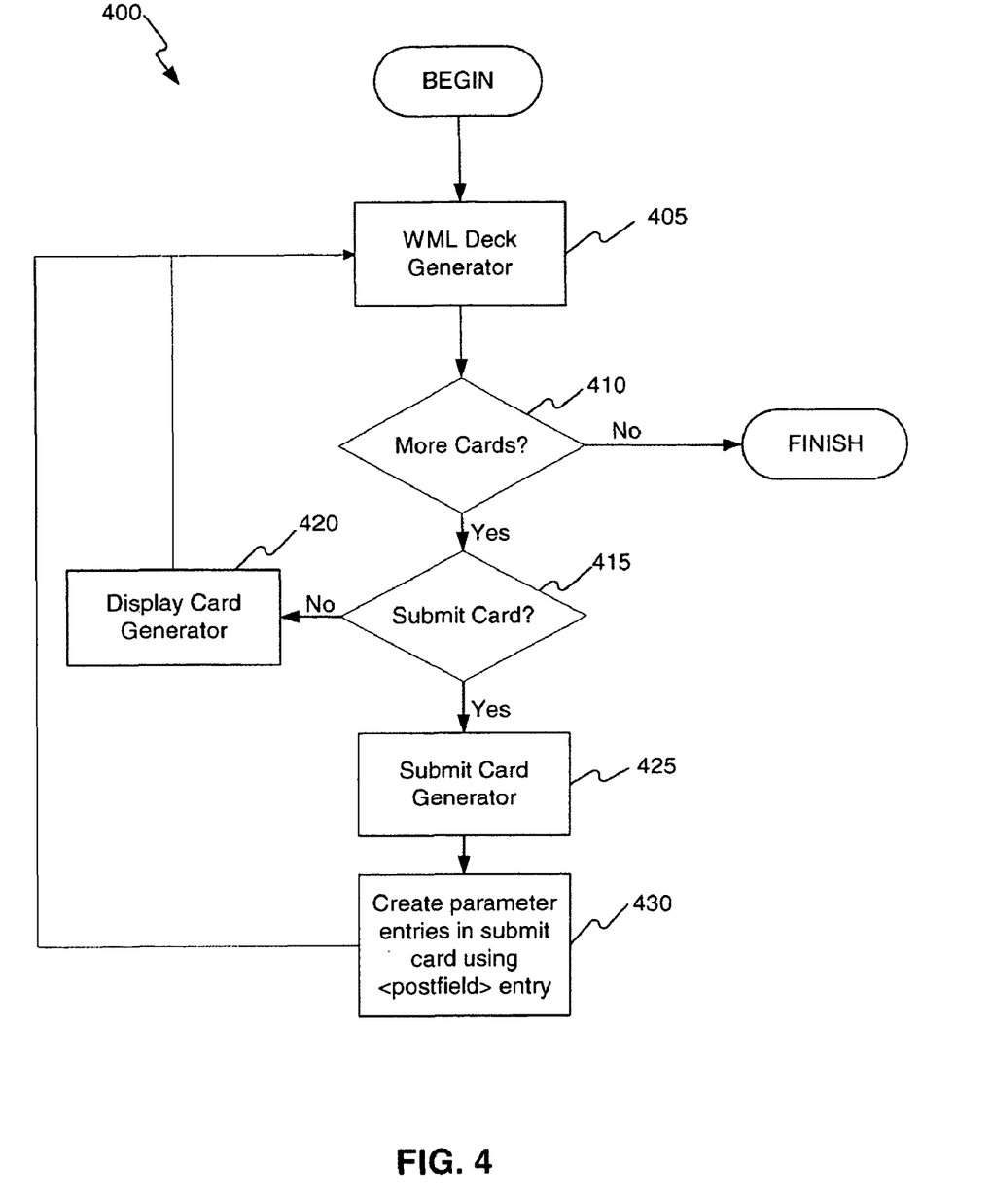
FIG. 4 illustrates a flow chart with steps for generating a deck of WML cards consistent with certain aspects related to the present invention.

FIG. 4 depicts a flowchart with steps for generating a WML deck 115 at server 160. WML generation is split between a deck generator and one or more card generators (one card generator for each card in deck) contained on the server 160. The deck generator generates the deck portion (e.g., WML deck 115) of the WML document and then calls card generators to generate the card portions (e.g., cards 117 and 119*a-d*).

Referring again to FIG. 4, the server 160 calls the deck generator to generate a WML deck 115, as shown in step 405. In step 410, the deck generator determines if a card is to be generated by evaluating either the parameters submitted by the last WML deck 115, the data on the server 160, or a combination of both. If the result of the evaluation is to generate a new card, the deck generator must then check the type of card to be generated, as shown in step 415. The deck generator determines the type of card to be generated by evaluating the same data set in step 410. The data may be any type of predetermined label that will alert the deck generator of the type of card to be generated. If it is not a submit card 117, the deck generator calls a card generator, as shown in step 420. The generation process is automated such that for each parameter value that needs to be changed, a <setvar> is generated in the card 119. The <setvar> is used to assign a value to a named variable. The assignment is done using a name and value pair where the name is set by the name attribute and the value is set by the value attribute. An exemplary <setvar> command may be <setvar name="p1" value="v1"/>. Once card generation is complete, control returns to the deck generator at step 405.

Returning to step 415, if the deck generator determines that a submit card 117 is to be generated, the deck generator calls a submit card generator, as shown in step 425. The process to generate a submit card 117 is automated such that, as shown in step 430, for each parameter to be submitted from the WML deck 115, one <posffield> entry is generated in the submit card 117. This results in a single instance of each parameter in the submit card 117 and eliminates redundant or duplicate parameter submission to the server 160. The <posffield> tag is used to set a name and value pair that can be transmitted to a server during a URL request. The name is set by the name attribute and must be a valid WML variable name. The value is set by the value attribute. An exemplary <posffield> command may be <posffield name="p1" value "$p1"/>.

Once the submit card 117 is generated and redundant (i.e., duplicate) parameters are accounted for, the deck generator returns again to steps 405 and determines whether there are more cards to generate, as in step 410. If not, the deck generation process finishes and the deck is sent to wireless device 105.

Common parameters are determined in the server 160 and may be determined either programmatically or by user-definition. In either case, data associated with cards 119 may be used to determine which parameters are common. For example, server 160 may generate the WML deck 115 and its associated cards 119*a-d* according to a XML document. A XML tag may be defined in the XML document as <p1>. If the XML tag appears in each of cards 119*a-d*, then the parameters associated with <p1> may be common among the cards.

Alternatively, the common parameters may be predetermined during the design of the cards 119. For example, a user may compose the layout and content associated with deck 115 and its cards 119. At that time, the user may also compose submit card 117. Specifically, each parameter of cards 119 may be linked to submit card 117, with common parameter being mapped to the same field in submit card 117 thereby ensuring a single instance of each parameter in submit card 117.

Figure 5:
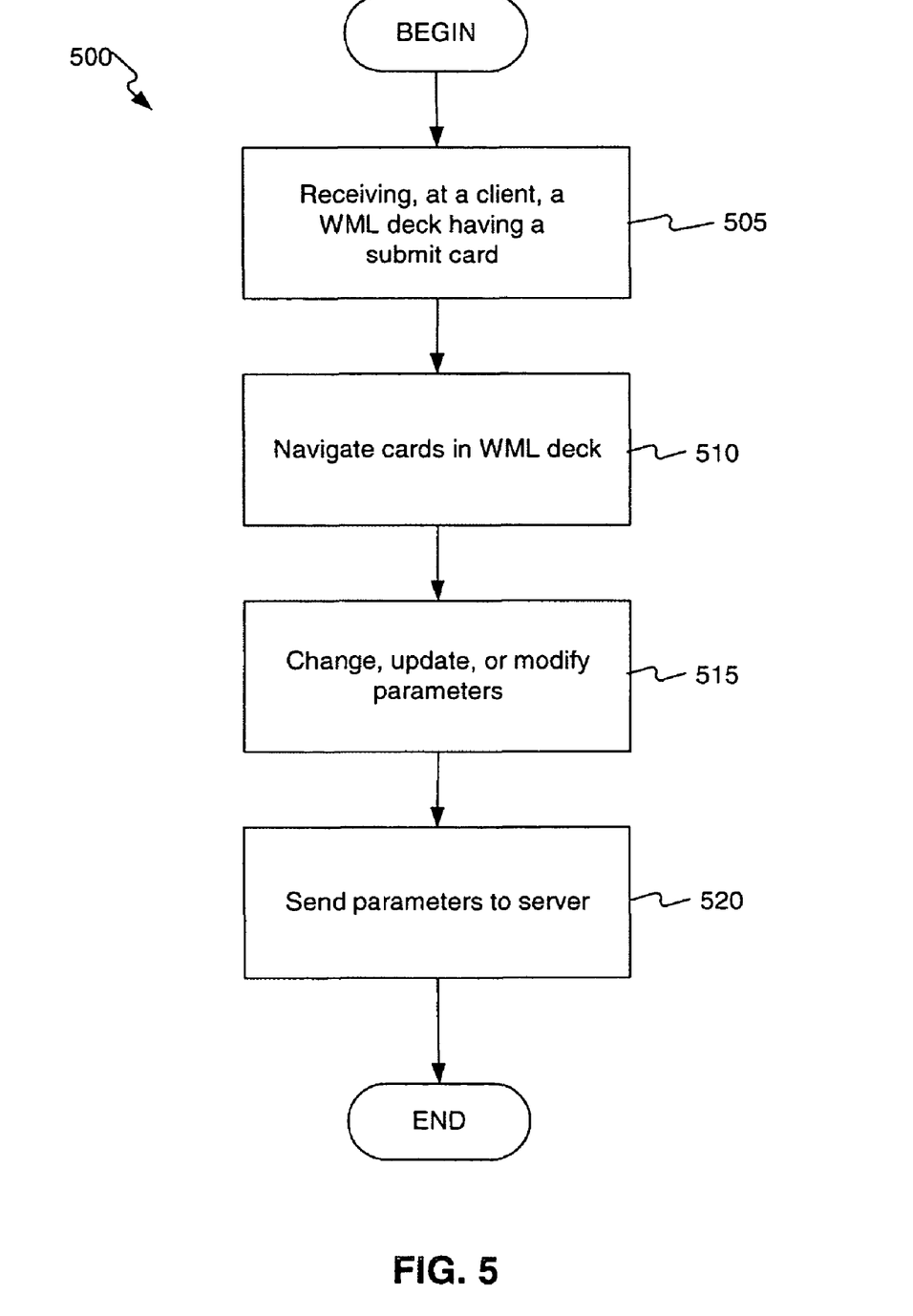
FIG. 5 illustrates a flow chart with steps for sending parameters to a server consistent with certain aspects related to the present invention.

FIG. 5 depicts a flowchart with steps for sending parameters from wireless device 105 using submit card 117. Referring to FIG. 5, the wireless device 105 receives a WML deck 115 containing cards, e.g., cards 119a-d and submit card 117, from a server 160 via a network 150, as shown in step 505. In step 510, the cards are navigated, either programmatically, through user interaction, or through user selection. Navigation may be achieved through the use of Uniform Resource Locators (URLs) contained within the card data. At any time during the navigation, either simultaneously or in conjunction with the navigation, parameter values may be updated, changed, or otherwise modified, either programmatically, through user interaction, or through user selection (step 515). The parameter values are then stored on the wireless device 105.

Once navigation of the deck is complete, the submit card 117 is accessed and used to send parameters and their values to the server 160, as shown in step 520. To send parameters from the cards 119a-d, submit card 117 accesses the stored parameter values for cards 119a-d, and sends only a single copy of each parameter and its value to the server 160 eliminating the transmission of duplicate parameters among cards 119a-d. The following provides an example of a card:

```
<card id="InvokingCard" title="Example">
    <anchor>
        <go href="#SubmitTemplate">
            <setvar name="p1" value="v1"/>
            <setvar name="p2" value="v2"/>
            <setvar name="p3" value="v3"/>
            .........
            <setvar name="pn" value="vn/>
        </go>
        Submit parameters
    </anchor>
</card>
```

The following is an example of a submit card:

```
<card id="SubmitTemplate">
    <onevent type="onenterbackward">
        <prev/>
    </onevent>
    <onevent type="onenterforward">
        <go href=#" method="post">
            <postfield name="p1" value "$p1"/>
            <postfield name="p2" value "$p2"/>
            <postfield name="p3" value "$p3"/>
            .........
            <postfield name="pn" value="$pn"/>
        </go>
    </onevent>
</card>
```

Although not shown, the process of creating a WML deck 115, sending the WML deck 115 to a wireless device 105, returning the parameter values to the server 160 and generating a new WML deck 115 may repeat. For example, once the parameters are sent by the wireless device 105 and received by the server 160, server 160 processes the parameters and prepares a response. When a server 160 prepares a response, server 160 may provide another WML deck 115 including new cards 119 and a new submit card 117. The parameters, instructions, and other data contained by the new cards 119 and submit card 117 may be different for each subsequent or later WML deck 115 generated by the server 160. Further, the display screens 219 associated with subsequent or later WML decks 115 may be different depending on the underlying parameters, instructions, and other data contained in the cards 119. For example, in the examples provided to illustrate the methods described herein, a user login screen is provided in the first WML deck 115. Subsequent or later decks may contain parameters, instructions, and other data to generate displays, applications, or other usages examples of which may include, for example: checking train or flight information, viewing traffic information, purchasing tickets, checking weather conditions, or looking up stock values, phone numbers, addresses and sports results.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer program product embodied on a non-transitory computer-readable medium containing instructions causing one or more data processors to execute operations for sending and receiving data between a wireless device and a server in a network, the operations comprising:

receiving, at the wireless device, a wireless markup language (WML) deck including a plurality of WML cards and a submit card, each WML card containing data and parameters to display a single screen in a browser on the wireless device, the submit card including WML tags and one or more parameter fields corresponding to data fields found in the plurality of WML cards, the submit card enabling the consolidation of parameters from the plurality of WML cards in the parameter fields such that the submit card includes a single instance of each parameter contained within the plurality of WML cards;

receiving, at the wireless device, user-generated input traversing at least two of the WML cards;

populating at least one of the parameter fields in the submit card based on the user-generated input; and transmitting, by the wireless device to the server, the submit card, the submit card containing the populated parameters for the traversed WML cards such that there is only a single copy of each parameter and no duplicates; and mapping parameters to the same parameter filed in the submit card via at least two WML cards.

2. A computer program product as in claim 1, wherein the submit card is a hidden card in that it cannot be rendered in the browser.

3. A computer program product as in claim 1, wherein the submit card can be rendered in the browser.

4. A computer program product as in claim 1, wherein the instructions further comprise:

receiving, from the wireless device, a request to generate the WML deck; initiating generation of the WML deck;

determining if a card is to be generated by evaluating either parameters submitted in a most recent WML deck, data on the server, or a combination of both;

generating the plurality of WML cards based on the determining; and generating the submit card so that there is only a single instance of each parameter in the plurality of WML cards.

5. A computer program product as in claim 4, wherein the WML cards are generated according to an extensible markup language (XML) document, the XML document have at least one defined XML tag, wherein generating the submit card comprises:

determining that two or more WML cards contain the same parameter if the same XML tag is in each card.

6. A computer program product as in claim 4, wherein each parameter in the WML cards is mapped to one parameter field in the submit card so that the submit card only contains a single instance of each parameter.

7. A computer program product as in claim 1, wherein the submit card comprises a template.

8. A computer program product as in claim 7, wherein the submit card includes WML tags and one or more blank data fields corresponding to data fields found in the WML cards.

9. A method for sending and receiving data between a wireless device and a server in a network, the method comprising:

receiving, at the wireless device, a wireless markup language (WML) deck including a plurality of WML cards and a submit card, each WML card containing data and parameters to display a single screen in a browser on the wireless device, the submit card including WML tags and one or more parameter fields corresponding to data fields found in the plurality of WML cards, the submit card enabling the consolidation of parameters from the plurality of WML cards in the parameter fields such that the submit card includes a single instance of each parameter contained within the plurality of WML cards;

receiving, at the wireless device, user-generated input traversing at least two of the WML cards;

populating at least one of the parameter fields in the submit card based on the user-generated input;

transmitting, by the wireless device to the server, by the submit card, the submit card containing the populated parameters for the traversed WML cards such that there is only a single copy of each parameter and no duplicates; and mapping parameters to the same parameter filed in the submit card via at least two WML cards.

10. A method as in claim 9, wherein the submit card is a hidden card in that it cannot be rendered in the browser.

11. A method as in claim 9, wherein the submit card can be rendered in the browser.

12. A method as in claim 9, further comprising: receiving, from the wireless device, a request to generate the WML deck; initiating generation of the WML deck;

determining if a card is to be generated by evaluating either parameters submitted in a most recent WML deck, data on the server, or a combination of both;

generating the plurality of WML cards based on the determining; and generating the submit card so that there is only a single instance of each parameter in the plurality of WML cards.

13. A method as in claim 12, wherein the WML cards are generated according to an extensible markup language (XML) document, the XML document have at least one defined XML tag, wherein generating the submit card comprises:

determining that two or more WML cards contain the same parameter if the same XML tag is in each card.

14. A method as in claim 12, wherein each parameter in the WML cards is mapped to one parameter in the submit card so that the submit card only contains a single instance of each parameter.

15. A method as in claim 9, wherein the submit card comprises a template.

16. A method as in claim 15, wherein the submit card includes WML tags and one or more blank data fields corresponding to data fields found in the WML cards.

17. A system for sending and receiving data between a wireless device and a server in a network, the system comprising:

a processor; and a memory, wherein the processor and the memory are configured to perform operations comprising:

receiving, at the wireless device, a wireless markup language (WML) deck including a plurality of WML cards and a submit card, each WML card containing data and parameters to display a single screen in a browser on the wireless device;

receiving, at the wireless device, user-generated input traversing at least two of the WML cards, the user generated input generating parameters associated with at least one of the WML cards;

populating at least one of the parameter fields in the submit card based on the user-generated input;

transmitting, by the wireless device to the server, the submit card, the submit card containing the parameters for the traversed WML cards such that there is only a single copy of each parameter and no duplicates; and mapping parameters to the same parameter filed in the submit card via at least two WML cards.

18. A system as in claim 17, wherein the operations mettu~further comprise:

receiving, from the wireless device, a request to generate the WML deck; initiating generation of the WML deck;

determining if a card is to be generated by evaluating either parameters submitted in a most recent WML deck, data on the server, or a combination of both;

generating the plurality of WML cards based on the determining; and generating the submit card so that there is only a single instance of each parameter in the plurality of WML cards.

19. A system as in claim 17, wherein the WML cards are generated according to an extensible markup language (XML) document, the XML document have at least one defined XML tag, wherein generating the submit card comprises:

determining that two or more WML cards contain the same parameter if the same XML tag is in each card.

20. A system as in claim 17, wherein the submit card comprises a template including WML tags and one or more blank data fields corresponding to data fields found in the WML cards.

* * * * *